United States Patent
Santhar et al.

(10) Patent No.: US 12,118,323 B2
(45) Date of Patent: Oct. 15, 2024

(54) OPTIMIZATION OF LIP SYNCING IN NATURAL LANGUAGE TRANSLATED VIDEO

(71) Applicant: International Business Machines Corporation, Armonk, NY (US)

(72) Inventors: Sathya Santhar, Ramapuram (IN); Sridevi Kannan, Katupakkam (IN); Sarbajit K. Rakshit, Kolkata (IN); Samuel Mathew Jawaharlal, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 17/482,549

(22) Filed: Sep. 23, 2021

(65) Prior Publication Data

US 2023/0093405 A1 Mar. 23, 2023

(51) Int. Cl.
*G06F 40/40* (2020.01)
*G10L 13/08* (2013.01)

(52) U.S. Cl.
CPC .............. *G06F 40/40* (2020.01); *G10L 13/08* (2013.01)

(58) Field of Classification Search
CPC .......... G06F 40/40; G06F 40/58; G06F 17/28; G10L 13/08; G10L 15/32; G10L 21/06; G10L 21/10; G06T 13/40
See application file for complete search history.

(56) References Cited

U.S. PATENT DOCUMENTS

| | | | | |
|---|---|---|---|---|
| 10,657,972 B2 * | 5/2020 | Hall | ...................... | G06F 40/221 |
| 10,885,693 B1 * | 1/2021 | Saragih | ................ | G06V 10/757 |
| 11,682,153 B2 * | 6/2023 | Pan | .......................... | G10L 13/00 |
| | | | | 704/259 |
| 11,769,056 B2 * | 9/2023 | Banerjee | .............. | G06V 10/774 |
| | | | | 382/156 |

(Continued)

FOREIGN PATENT DOCUMENTS

| | | | | | |
|---|---|---|---|---|---|
| GB | 2601162 A | * | 5/2022 | ............. | G06T 13/40 |
| KR | 20190114150 A | * | 10/2019 | ............. | G06F 17/28 |

(Continued)

OTHER PUBLICATIONS

Michail C. Doukas, Viktorija Sharmanska, Stefanos Zafeiriou, Video-to-Video Translation for Visual Speech Synthesis, arXiv:1905.12043v1 [cs.CV] May 28, 2019, pp. 1-10 (Year: 2019).*

(Continued)

*Primary Examiner* — Richemond Dorvil
*Assistant Examiner* — Nadira Sultana
(74) *Attorney, Agent, or Firm* — Nicholas A. Welling (57) ABSTRACT

An approach for generating an optimized video of a speaker, translated from a source language into a target language with the speaker's lips synchronized to the translated speech, while balancing optimization of the translation into a target language. A source video may be fed into a neural machine translation model. The model may synthesize a plurality of potential translations. The translations may be received by a generative adversarial network which generates video for each translation and classifies the translations as in-sync or out of sync. A lip-syncing score may be for each of the generated videos that are classified as in-sync.

14 Claims, 6 Drawing Sheets

(56) References Cited

U.S. PATENT DOCUMENTS

| | | | | |
|---|---|---|---|---|
| 2004/0068410 | A1* | 4/2004 | Mohamed | G06F 40/30 704/E21.02 |
| 2010/0057455 | A1* | 3/2010 | Kim | G10L 21/10 704/235 |
| 2012/0265807 | A1* | 10/2012 | Kowalewski | H04L 65/1016 709/204 |
| 2019/0244623 | A1* | 8/2019 | Hall | G06T 13/40 |
| 2020/0027445 | A1* | 1/2020 | Raghunathan | G10L 15/32 |
| 2022/0084273 | A1* | 3/2022 | Pan | G06N 3/049 |

FOREIGN PATENT DOCUMENTS

| | | | | |
|---|---|---|---|---|
| KR | 1020190114150 A | | 10/2019 | |
| WO | WO-2022110354 A1 | * | 6/2022 | G06F 40/58 |
| WO | WO-2022255529 A1 | * | 12/2022 | G10L 19/0018 |

OTHER PUBLICATIONS

Michail C. Doukas, Viktoriia Sharmanska, Stefanos Zafeiriou, Video-to-Video Translation for Visual Speech Synthesis, arXiv:1905.12043v1 [cs.CV] May 28, 2019, pp. 1-10 (Year: 2019).*

Sanjib Narzary, Maharaj Brahmaz, Bobita Singhax, Rangjali Brahma, Bonali Dibragede and Sunita Barman, Attention based English-Bodo Neural Machine Translation System for Tourism Domain, IEEE Xplore, 2019, pp. 335-343 (Year: 2019).*

Ruobing Zheng, Zhou Zhu, Bo Song, and Changjiang Ji, A Neural Lip-Sync Framework for Synthesizing Photorealistic Virtual News Anchors, arXiv:2002.08700v2 [cs. CV] May 5, 2021, pp. 1-8 (Year: 2021).*

Doukas et al., "Video-to-Video Translation for Visual Speech Synthesis", 10 pages, arXiv:1905.12043v1 [cs.CV] May 28, 2019.

Jalalifar et al., "Speech-Driven Facial Reenactment Using Conditional Generative Adversarial Networks", arXiv:1803.07461v1 [cs.CV] Mar. 20, 2018, 12 pages.

Akew et al., "Machine Translation Verbosity Control for Automatic Dubbing", ICASSP 2021—2021 IEEE International Conference on Acoustics, Speech and Signal Processing (ICASSP) | 978-1-7281-7605-5/20, DOI: 10.1109/ICASSP39728.2021.9414411, 5 pages.

Mell et al., "The NIST Definition of Cloud Computing", Recommendations of the National Institute of Standards and Technology, NIST Special Publication 800-145, Sep. 2011, 7 pages.

Morishima et al., "Multimodal Translation System Using Texture-Mapped Lip-Sync Images for Video Mail and Automatic Dubbing Applications", Received Nov. 25, 2002; Revised Jan. 16, 2004, EURASIP Journal on Applied Signal Processing, 13 pages.

Prajwal et al., "A Lip Sync Expert Is All You Need for Speech to Lip Generation in the Wild", arXiv:2008.10010v1 [cs.CV] Aug. 23, 2020, ACM ISBN 978-1-4503-7988-5/20/10, <https://doi.org/10.1145/3394171.3413532>, 10 pages.

Prajwal et al., "Towards Automatic Face-to-Face Translation", arXiv:2003.00418v1 [cs.CV] Mar. 1, 2020, ACM ISBN 978-1-4503-6889-6/19/10, <https://doi.org/10.1145/3343031.3351066>, 9 pages.

Saboo et al., "Integration of Dubbing Constraints into Machine Translation", Proceedings of the Fourth Conference on Machine Translation (WMT), vol. 1: Research Papers, pp. 94-101, Florence, Italy, Aug. 1-2, 2019.

International Search Report and Written Opinion, International Application No. PCT/CN2022/120554, International Filing Date Sep. 22, 2022.

* cited by examiner

OPTIMIZATION OF LIP SYNCING IN NATURAL LANGUAGE TRANSLATED VIDEO

BACKGROUND OF THE INVENTION

The present invention relates generally to natural language processing, more specifically, to translating a video of a speaker in a source language into a target language and generating video with the speaker's lip movement synchronized to the target language.

A generative adversarial network (GAN) is an innovation in machine learning utilizing deep learning methods for generative modeling. GANs can consist of two sub-models: a generator model, trained to generate new examples and a classifier model which classifies the generated example as real or fake. The two models are trained together in an adversarial loop, until the classifier model classifies roughly half of the generated examples as real.

Natural language processing is the automatic manipulation of natural language by software. Natural language is a human understood spoken and written language such as English, Arabic, Spanish, or Japanese. Natural language processing can include manipulations such as translating speech and text from one natural to another. Additionally, natural language processing can include manipulating natural language into a computer understood format, providing semantic meaning by converting words and sentences into vectors or similar representations.

SUMMARY

Embodiments of the present disclosure include a computer-implemented method, computer program product, and a system for optimizing generated lip-synced videos for neural machine translations. Embodiments may include receiving, by a processor, a source video of a speaker in a source language. Embodiments may also include synthesizing a plurality of speech translations of the source video in a target language based on a neural machine translation model, wherein the neural machine translation model is trained to synthesize a variable number of translations based on a variable beam width. Additionally, embodiments may include generating a lip synchronized video for each of the plurality of synthesized speech translations based on a generation sub-model within a generative adversarial network architecture. Further, embodiments many include classifying each lip synchronized video as synchronized or not synchronized, based on a classification sub-model within a generative adversarial network. Embodiments may also include generating a lip-sync score for each lip synchronized video classified as synchronized.

The above summary is not intended to describe each illustrated embodiment of every implementation of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The embodiments depicted and described herein recognize the benefits of optimization of lip synchronization in generated videos with natural language translation. In many translated videos the original source audio is simply removed, and the target language is dubbed over the video itself. This leads to a mismatch between the mouth movements or lips of the speaker in the video and the audio. Humans are sensitive to any mismatch in lip synchronization and utterance. Realistic lip animation that is synchronous with a speech utterance is not only pleasing to the human eye but can prevent distraction and possibly a person stopping or turning a video off due to a lack of lip and audio synchronization.

Machine translation of an utterance from a source language to a target language can sometimes cause an issue with the synchronization of a speaker's lips and translated audio. This may be an issue with length of words or number of words within the translation. It is also possible that the translation could be incorrect, or the style of a text-to-speech voiceover is incompatible with the generated lip-synchronization. Embodiments described herein appreciate that it may take more than one machine translation of an utterance in order to generate a video with adequate synchronization between the lips of the speaker and the generated audio translation. That being said, embodiments presented in this description may provide enhanced user experience by providing an optimal translation in the target language with matching video that has an optimal lip-synchronization. It should be noted, throughout this description, the terms lip-synchronization, mouth movement, and lip movement may be used interchangeably. The aforementioned terms are meant to refer to a video's audio and visual data of a speaker synchronizing or matching, thus providing a pleasant user experience.

In an embodiment of the present invention, a neural machine translation system may produce the most likely candidate translation(s) in a target language, for a video in a source language. A generative adversarial network may receive candidate translations and generate a video for each of the candidate translations. The generative adversarial network may classify each of the generated videos as either: (i) the lips are synced to the translated text-to speech voice over or (ii) the lips are not synced to the translated text-to-speech voiceover. Additionally, a lip synchronization score may be generated for any generated videos that are classified with synchronized lips to the text-to-speech.

Additionally, in some embodiments, the neural machine translation system may generate an output of one or more translations in a target language of a source video in a source language. The output may be a topK result or the most likely output for the target language of the probable output based on a predetermined or dynamically determined beam width selection. In some embodiments, the beam width may be a learnable parameter of the neural machine translation system which can be optimized in a training process.

In an embodiment, the generative adversarial network may utilize a cycle architecture ("cycle GAN") in which the cycle consistency loss is continuously feed back into the generator sub-model from the discriminator sub-model based on a comparison of the source video to the generated video (explained in more detail below). This process may be performed in an iterative fashion further tuning the cycle GAN and generating a more realistic generated translated lip synced video. For example, a source video may be fed into the cycle GAN resulting in an output multiple translations and generated videos for the translations. The lip synchronization can be compared to the source video for all generated videos. Any calculated loss can be incorporated into the generator sub-model tuning the generator sub-model.

A generative adversarial network is a machine learning model with at least two sub-models, where one model generates an image or images (e.g., for video) and attempts to fool a classification sub-model into classifying the generated image as real. In the case of the present invention, embodiments are attempting generate video that is classified as in-sync with regards to the lip-movement and the translation audio data. In training a generative adversarial network, multiple types of images are provided, some of which have matching or lip synchronized videos, while others have audio and lip movement out of sync. The generative adversarial network is then trained until the generated translated videos are classified as in-sync roughly 50% of the time.

In an embodiment of the invention, the determination sub-model can be a recurrent neural network which utilizes landmarks within on the speaker's face (e.g., lips, mouth, cheeks, etc. . . . ) to produce highly realistic face conditions for generated speech. For example, the determination sub-model may have the ability to learn facial landmarks associated with phoneme-viseme mapping in a self-supervised manner during training. In an embodiment, the determination sub-model may be a recurrent neural network with an additional fully connected layer to smooth out any irregularities. This can allow the determination sub-model to be language independent, thus resulting in a system that may generate lip-synchronized videos for multiple target languages.

In an embodiment of the present invention, there may be a lip-synchronization scoring capability. For example, a fully connected neural network may act as a softmax layer to receive translated lip-synced videos that have been labeled or classified as lip-synced. The lip-sync score can be a measure of the accuracy of the phoneme to expected lip landmark, voice stylization to facial expression in the speech, and or the timing of the facial/lip landmarks compared to the expected phoneme. In a situation where multiple translated lip-synced videos have been labeled as lip-synced, the lip-sync score can allow for a determination of which generated video should be presented.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
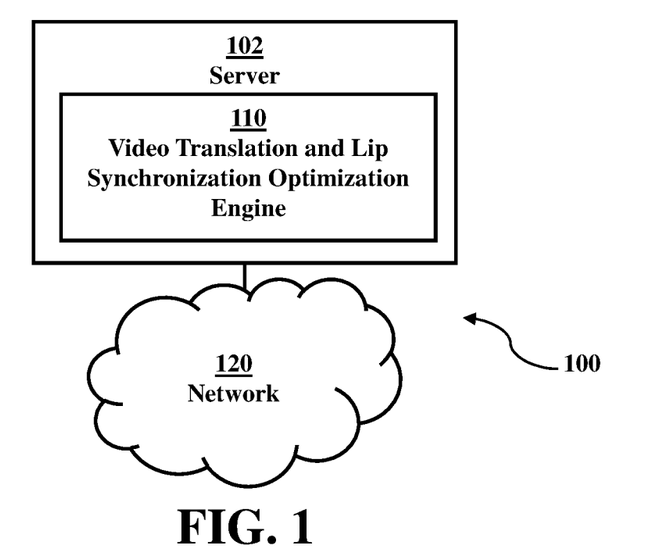
FIG. 1 is a functional block diagram generally depicting video translation and lip synchronization optimization environment 100 for optimizing natural language translation and generating video with lip synchronization to the natural language translation, in accordance with an embodiment of the present invention.

FIG. 1 is a functional block diagram depicting, generally, video translation and lip synchronization optimization environment 100. Shown within video translation and lip synchronization optimization environment 100 is server 102 and network 120. Also shown in FIG. 1 is video translation and lip synchronization optimization engine 110.

Server 102 can be a standalone computing device, a management server, a web server, a mobile computing device, or any other electronic device or computing system capable of receiving, sending, and processing data. In other embodiments, server 102 can represent a server computing system utilizing multiple computers as a server system. It should be noted, while one server and one client computer are shown in FIG. 1, video translation and lip synchronization optimization environment 100 can have any number of servers and client computers (e.g. 1, 2, n . . . n+1). In another embodiment, server 102 can be a laptop computer, a tablet computer, a netbook computer, a personal computer, a desktop computer, or any programmable electronic device capable of communicating with other computing devices (not shown) within video translation and lip synchronization optimization environment 100 via network 120.

In another embodiment, server 102 represents a computing system utilizing clustered computers and components (e.g., database server computers, application server computers, etc.) that can act as a single pool of seamless resources when accessed within video translation and lip synchronization optimization environment 100. Server 102 can include internal and external hardware components, as depicted, and described in further detail with respect to FIG. 5.

In an embodiment, video translation and lip synchronization optimization engine 110 can be a computer program that generates translated videos of speakers in a target language—from a video speaking in a source language—with the lip and mouth movement synchronized to the generated translation. Video translation and lip synchronization optimization engine 110 can have multiple computer modules (explained in more detail below) for receiving a source video of a speaker in a target language, generating multiple best translations in a target language, generating a video for each translation with lip synchronization to the translation, classifying each translation as either synchronized or not synchronized, and generating a lip sync score for any generated video that is classified as synchronized.

Network 120 can be, for example, a local area network (LAN), a wide area network (WAN) such as the Internet, or a combination of the two, and can include wired, wireless, or fiber optic connections. In general, network 120 can be any combination of connections and protocols that will support communications between server 102, and other computing devices (not depicted) within video translation and lip synchronization optimization environment 100.

Figure 2:
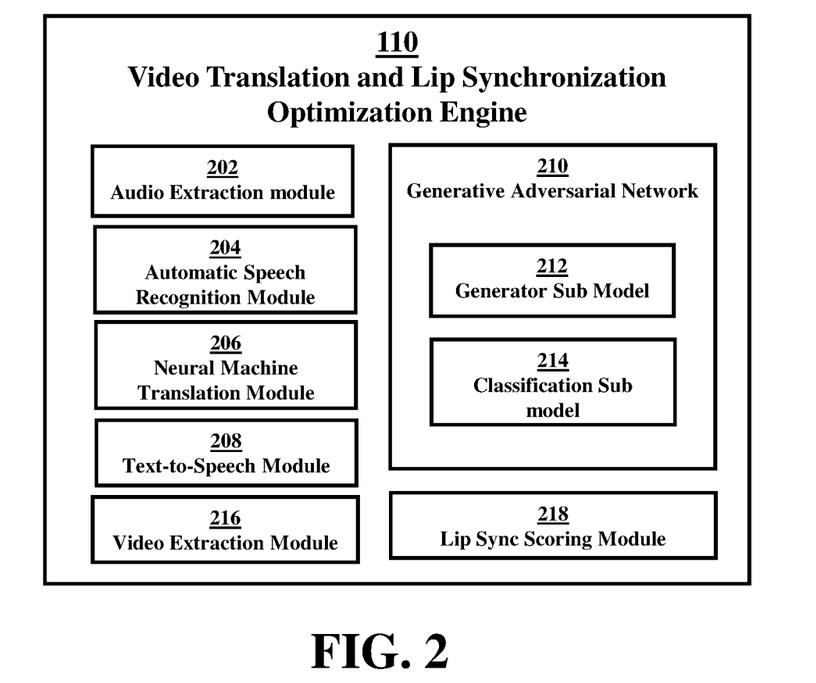
FIG. 2 is a block diagram of a video translation and lip synchronization optimization Engine, in accordance with an embodiment of the present invention.

FIG. 2 is a block diagram of video translation and lip synchronization optimization engine 110. Shown on video translation and lip synchronization optimization engine 110 is audio extraction module 202, automatic speech recognition module 204, neural machine translation module 206, text-to-speech module 208, generative adversarial network 210, video extraction module 216, and Lip Sync Scoring Module 218.

Audio extraction module 202 is a computer module that can extract audio data from a video of a speaker. Further, in some embodiments, audio extraction module 202 can isolate natural language utterances from other noises or sounds within the audio data from a source video. For example, video translation and lip synchronization optimization engine 110 may receive a video of a speaker. The video may have audio data with of a speaker and ambient background noises (e.g., birds chirping, dogs barking, vehicles going past). Audio extraction module 202 can isolate the natural language utterances or the ambient noises based on recognizable wave patterns associated with either data point.

Automatic speech recognition module 204 is a computer module that can isolate natural language utterances and generate a text-based representation or transcript of audio data. In an embodiment, automatic speech recognition module 204 can isolate natural language utterances in audio data. Automatic speech recognition module 204 can identify phonemes based on recognizable patterns in audio data and generate words based on the most probable combination of the phonemes. For example, audio data may be fed into a neural network (e.g., recurrent neural network, long-short term memory, etc.) and words may be generated based on the most likely combination of phonemes. Further, in some neural networks, combinations of words may be determined based on the most likely word combinations or word associations.

Neural machine translation module 206 is a computer program that can translate text is a source language into text in a target language. In an embodiment, neural machine translation module 206 can receive text in a source language and generate multiple translation scripts. The number of translation scripts can be based on a beam search algorithm. A beam search algorithm is a trainable parameter that allows neural machine translation module to translate a source word into the target word based on the source sentence. Multiple words in the target language can be determined for the input sentence (i.e., the top "k" words or beam width). The number of potential target words can allow for multiple alternatives for an input sentence at each timestep based on conditional probability and a dynamically determined or user selected beam width (e.g., "k").

In an embodiment, neural machine translation module 206 can generate the top "k" best translated test scripts in a target language based on a beam width "k" parameter optimized during training. Source text can be converted into an input vector. The input vectors can be fed into an encoder made up of multiple nodes (e.g., recurrent neural networks, transformers, etc. . . . ) to create an encoding vector for each term, entity, and/or concept. The encoding vector can be fed into a decoder made of multiple nodes (e.g., recurrent neural networks, transformers, etc. . . . ). The output vector can be fed into a fully connected neural network trained to predict the most probable word or words based on the output vector. Additionally, in another embodiment, the fully connected layer can be optimized to predict the best words or top "k" scripts based on the output vectors.

Text-to-speech module 208 is a computer module that can receive text and/or a transcript in a target language and generate speech. In an embodiment, text-to-speech module 208 can generate the phonemes associated with text in the translated text or transcript to generate audio data in the target language. In an embodiment, text-to-speech module 208 can be trained with a corpus of audio data associated with a speaker in the source language. Text-to-speech module 208 can be trained to accurately replicate the inflection, pace, and voice stylization of the speaker based on combining the phonemes of the source language to replicate a source video that is to be translated.

Generative adversarial network 210 is a computer module that can have two distinct sub-model operational on it. Generator sub-model 212 is a neural network that can receive video data of a speaker and synthesize new images of the speaker with mouth and lip positions corresponding to the positions the mouth and lips would be in if speaking a transcript. In an embodiment, generator sub-model 212 can generate still images associated with a timestamp of speech from text-to-speech module where the mouth movement of the speaker matches to the phoneme associated with the translated speech. Multiple still images are created and combined to create a seamless motion picture, where the speaker's mouth/lips are synchronized to the speech.

In an embodiment, generator sub-model 212 can consist of multiple layers of neural networks. For example, mouth landmarks from a speaker can be identified and fed into a fully connected neural network. Following the fully connected neural network, multiple layers of convolutional neural networks can be utilized to generate synthetic images with accurate mouth positioning.

Classification sub-model 214 is a neural network that can identify whether an image or video is in-sync with the associated speech. In an embodiment, classification sub-model 214 can receive one or more generated still images and the associated speech timestamp. Classification sub-model 214 can identify if the lip or mouth shape is correct based on the phoneme associated with the speech. For example, classification sub-model 214 can have multiple neural network layers, such as a multilayered convolutional neural network for analyzing an input image and word/phoneme. The multilayered convolutional neural networks can be followed by an output softmax layer configured to receive the input of the final convolutional neural network and classify the image or images as in-sync or out-of-sync (i.e., 1 or 0).

Video extraction module 216 can be a computer module that can isolate visual data of a source video. Video extraction module 216 can extract the still images and the timestamps associated with each image. Further, video extraction module 216 can feed the extracted visual data into generative adversarial network 210.

Lip sync scoring module 218 is a computer module that can generate a lip sync score for translated video generated by generative adversarial network 110 that has been classified as in-sync. In an embodiment, lip sync scoring module 218 can have a fully connected neural network that can receive the translation of a generated video classified as in-sync. The neural network can have an output softmax layer configured to produce a lip sync score (e.g., the probability of corresponding translation is correct or the best translation). The translation can be fed into the fully connected neural network.

Figure 3:
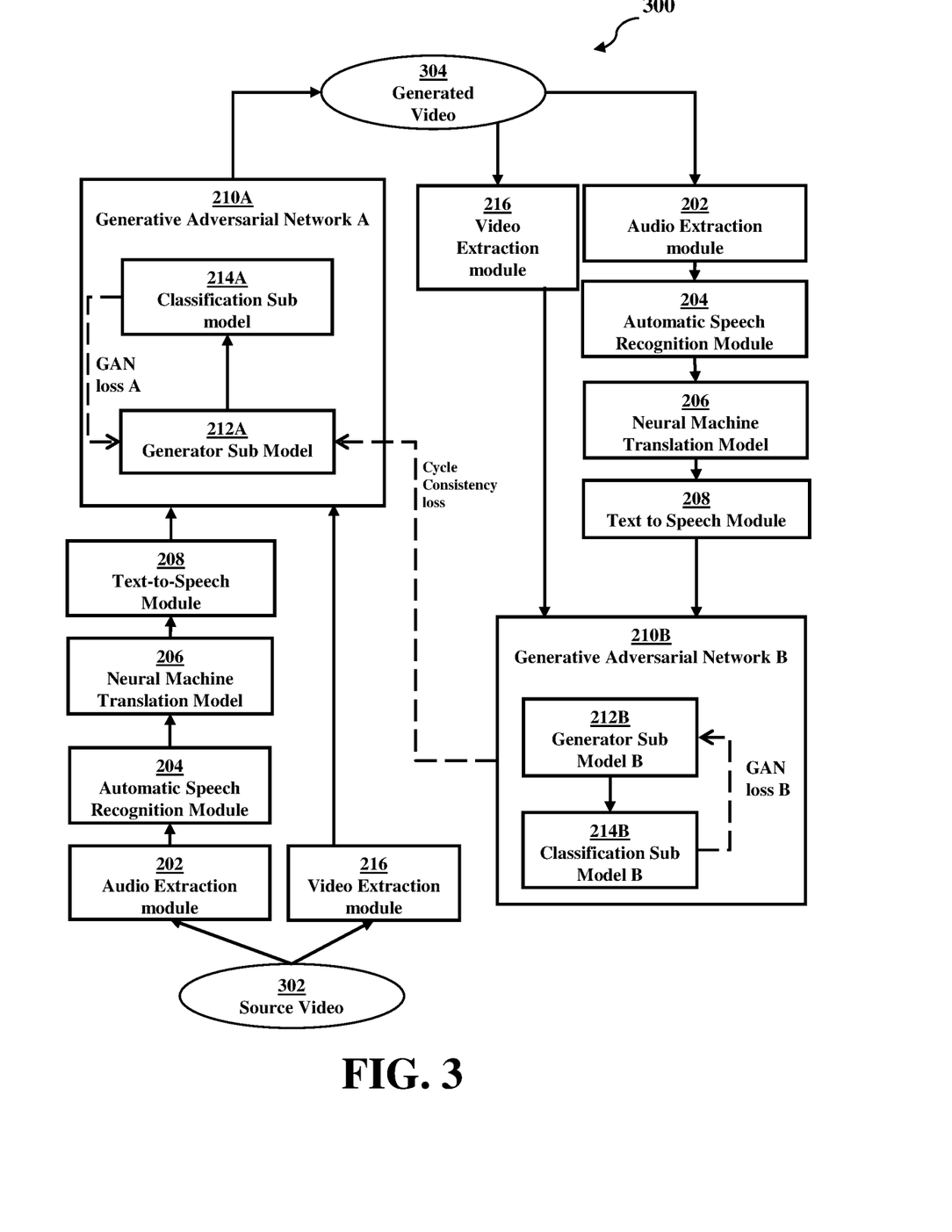
FIG. 3 is an exemplary flow for training a cycle generative adversarial network for optimizing natural language translation and generating video with lip synchronization to the natural language translation, in accordance with an embodiment of the present invention.

FIG. 3 is an example flow, generally designated 300, for training a cyclic general adversarial network within lip synchronization optimization environment 100 in accordance with an embodiment of the invention. Source video 302 can be fed into audio extraction module 202 and video extraction module 216. Source video 302 can be a video from a corpus of videos featuring a speaker in a source language. The source video 302 can have a known best translation or multiple known translations. The extracted audio data can be received by automatic speech recognition module 204. Automatic speech recognition module 204 can generate text corresponding to the audio data. Neural machine translation module 206 can translate the generated text into multiple target language transcripts based on the beam width. The translated text transcripts can be converted to a corresponding number of audio speech recordings in the target language by text-to-speech module 208. Video extraction module 216 can send the extracted visual data from source video 302. Generator sub model 212A can generate a lip-synced video for each translated speech recording. Classification sub model 214A can classify each generated lip-synced video as in-sync or out-of-sync. The GAN loss A can be calculated from the generated videos that were classified as out of sync and generator sub model 212A can be updated with the GAN loss A.

The generated video 304 can be fed into the same network architecture, but with modules configured to reverse the process as described in the last paragraph. Here, automatic speech recognition module 204 is configured to recognize the target language, neural machine translation model 206 is configured to translate the text target language into a configurable number of source language transcripts, and text-to-speech module 208 is configured to convert text in the source language into speech in the source language. That being said, generative adversarial network B 210B can generate lip synced video based on the generated speech and classification sub model B 214B can classify the generated video as in-sync or out-of-sync. GAN loss B can be calculated based on the generated videos classified as out-of-sync. Further, a cycle consistency loss can be calculated based on a comparison of the videos generated by generator sub model B 212B classified as in-sync by classification sub model B 214B and the original source video 302.

Figure 4:
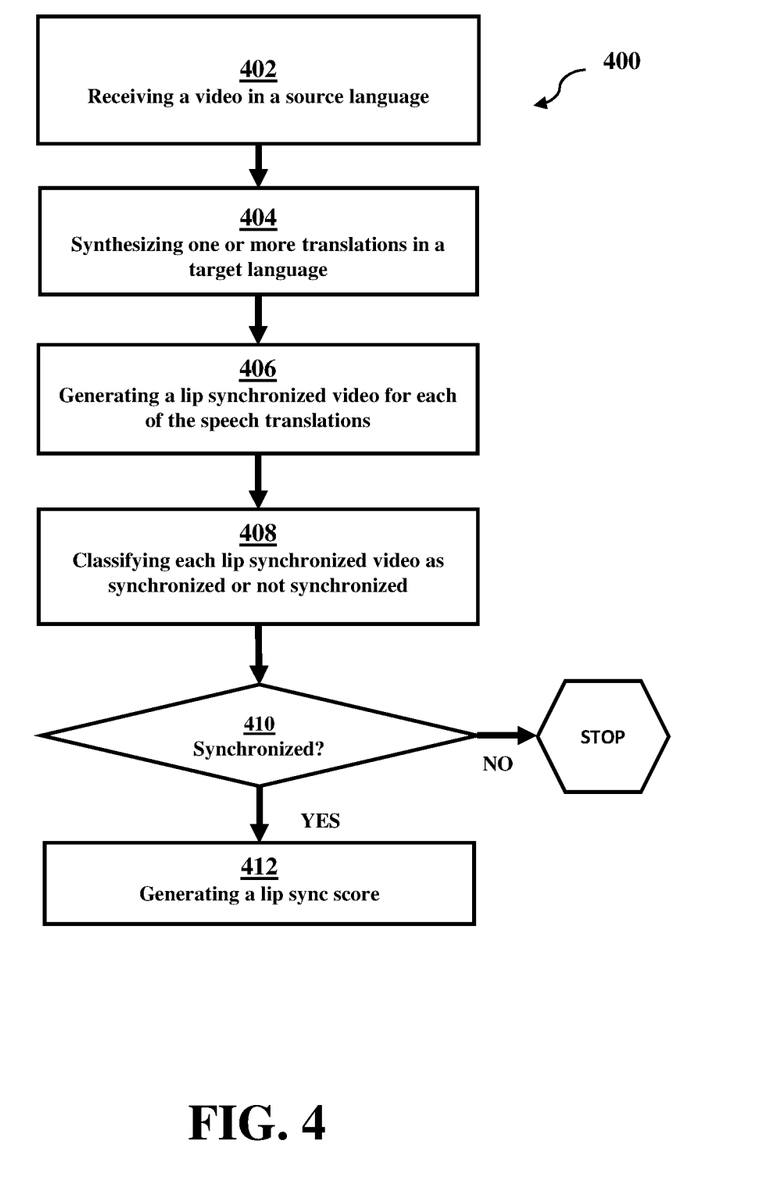
FIG. 4 is a flowchart depicting operational steps of a method for optimizing natural language translation and generating video with lip synchronization to the natural language translation, in accordance with an embodiment of the present invention.

FIG. 4 is a flowchart depicting operational steps of lip synchronization optimization of natural language translation in videos 400. At step 402, a video in a source language can be received by video translation and lip synchronization optimization engine 110. At step 404, neural machine translation module 206 can generate one or more translations in a target language. At step 406, generative adversarial network 210 can generate a lip synchronized video for each of the speech translations. At step 408, generative adversarial network 210 can classify the generated lip synchronized videos as in-sync or out-of-sync. At decision step 410, classification sub model 214 can determine if the generated lip synchronized video is classified as in-sync (i.e., synchronized). If the video is classified as in-sync, proceed to step 412. If the video is classified as out of sync (i.e., unsynchronized), stop. At step 412, lip sync scoring module 218 can generate a lip sync score for the generated lip synchronized videos classified as in-sync.

Figure 5:
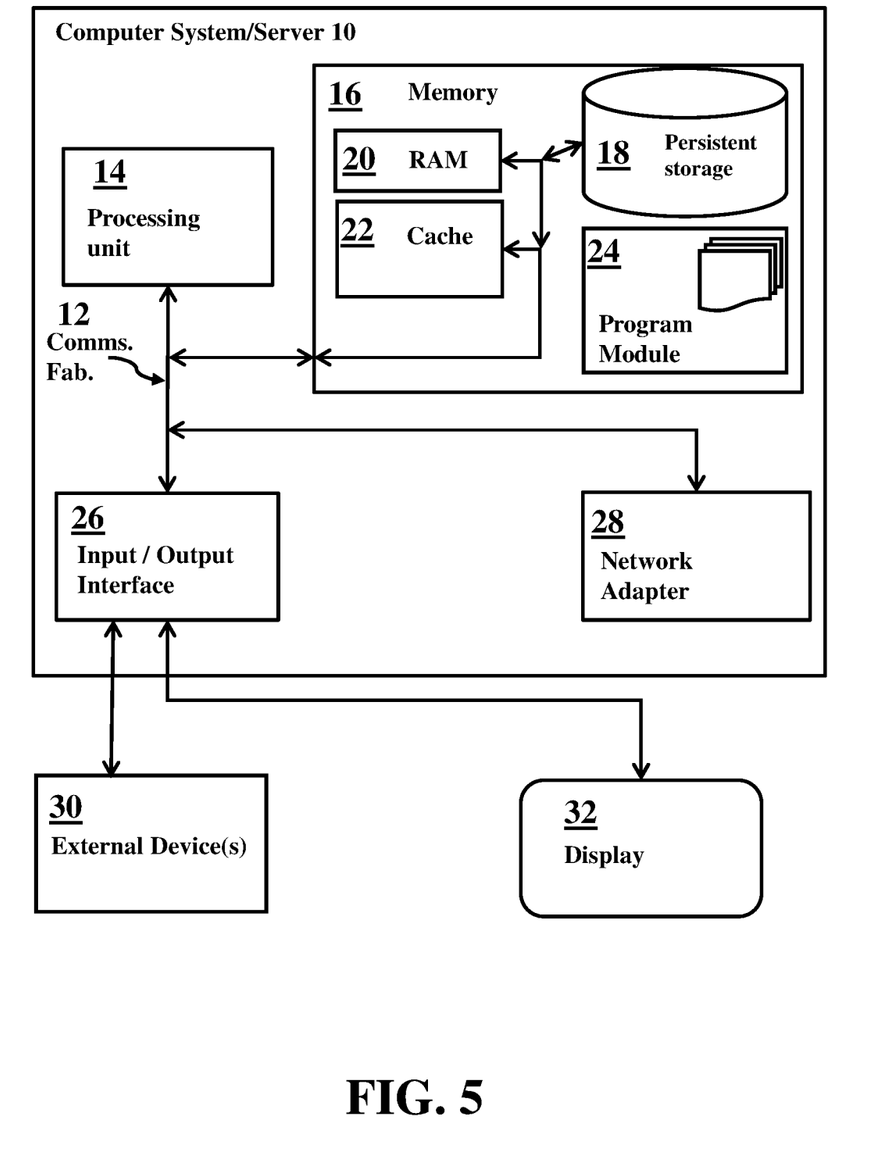
FIG. 5 is a functional block diagram of an exemplary computing system within video translation and lip synchronization optimization environment 100, in accordance with an embodiment of the present invention.

FIG. 5 depicts computer system 10, an example computer system representative of a dynamically switching user interface computer 10. Computer system 10 includes communications fabric 12, which provides communications between computer processor(s) 14, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Computer system 10 includes processors 14, cache 22, memory 16, persistent storage 18, network adaptor 28, input/output (I/O) interface(s) 26 and communications fabric 12. Communications fabric 12 provides communications between cache 22, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses or a crossbar switch.

Memory 16 and persistent storage 18 are computer readable storage media. In this embodiment, memory 16 includes random access memory (RAM) 20. In general, memory 16 can include any suitable volatile or non-volatile computer readable storage media. Cache 22 is a fast memory that enhances the performance of processors 14 by holding recently accessed data, and data near recently accessed data, from memory 16. As will be further depicted and described below, memory 16 may include at least one of program module 24 that is configured to carry out the functions of embodiments of the invention.

The program/utility, having at least one program module 24, may be stored in memory 16 by way of example, and not limiting, as well as an operating system, one or more application programs, other program modules, and program data. Each of the operating systems, one or more application programs, other program modules, and program data or some combination thereof, may include an implementation of a networking environment. Program module 24 generally carries out the functions and/or methodologies of embodiments of the invention, as described herein.

Program instructions and data used to practice embodiments of the present invention may be stored in persistent storage 18 and in memory 16 for execution by one or more of the respective processors 14 via cache 22. In an embodiment, persistent storage 18 includes a magnetic hard disk drive. Alternatively, or in addition to a magnetic hard disk drive, persistent storage 18 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Network adaptor 28, in these examples, provides for communications with other data processing systems or devices. In these examples, network adaptor 28 includes one or more network interface cards. Network adaptor 28 may provide communications through the use of either or both physical and wireless communications links. Program instructions and data used to practice embodiments of the present invention may be downloaded to persistent storage 18 through network adaptor 28.

I/O interface(s) 26 allows for input and output of data with other devices that may be connected to each computer system. For example, I/O interface 26 may provide a connection to external devices 30 such as a keyboard, keypad, a touch screen, and/or some other suitable input device. External devices 30 can also include portable computer readable storage media such as, for example, thumb drives, portable optical or magnetic disks, and memory cards. Software and data used to practice embodiments of the present invention can be stored on such portable computer readable storage media and can be loaded onto persistent storage 18 via I/O interface(s) 26. I/O interface(s) 26 also connect to display 32.

Display 32 provides a mechanism to display data to a user and may be, for example, a computer monitor or virtual graphical user interface.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality and operation of possible implementations of systems, methods, and computer program products according to various embodiments of the present invention. In this regard, each block in the flowchart or block diagrams may represent a module, segment or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
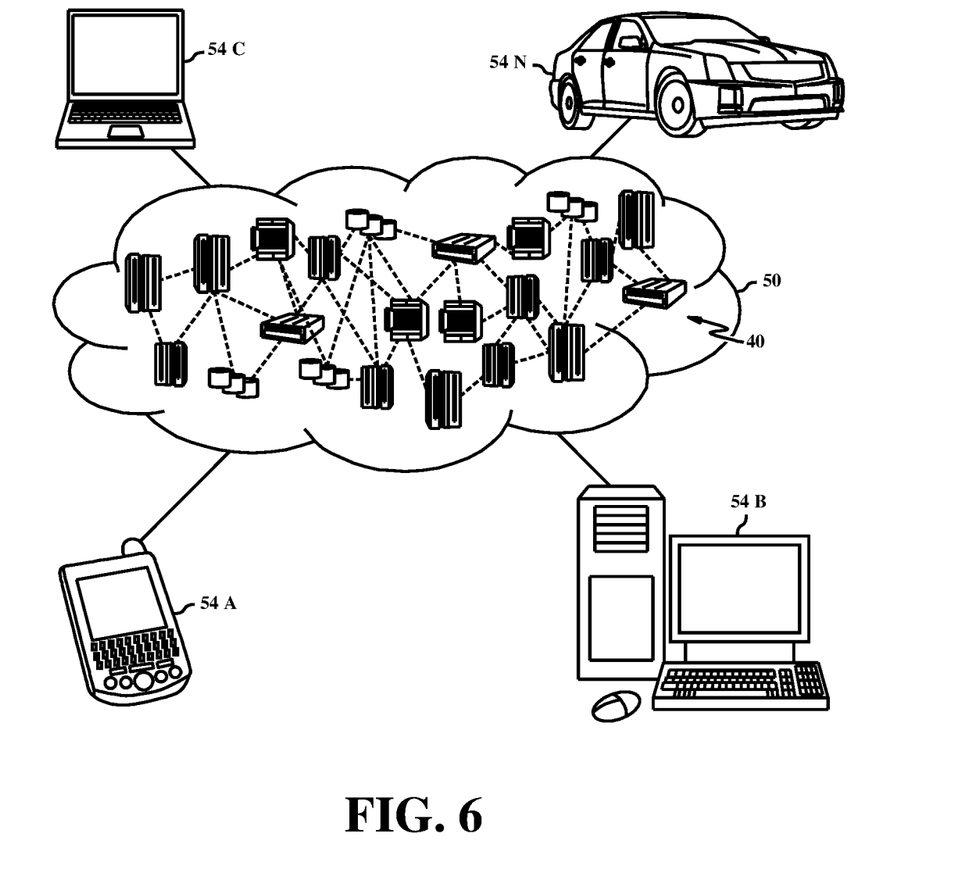
FIG. 6 is a diagram depicting a cloud computing environment, in accordance with an embodiment of the present invention.

FIG. 6 is a block diagram depicting a cloud computing environment 50 in accordance with at least one embodiment of the present invention. Cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 40 and cloud computing environment 50 can communicate with any type of computerized device over any type of network and/or network addressable connection (e.g., using a web browser).

Figure 7:
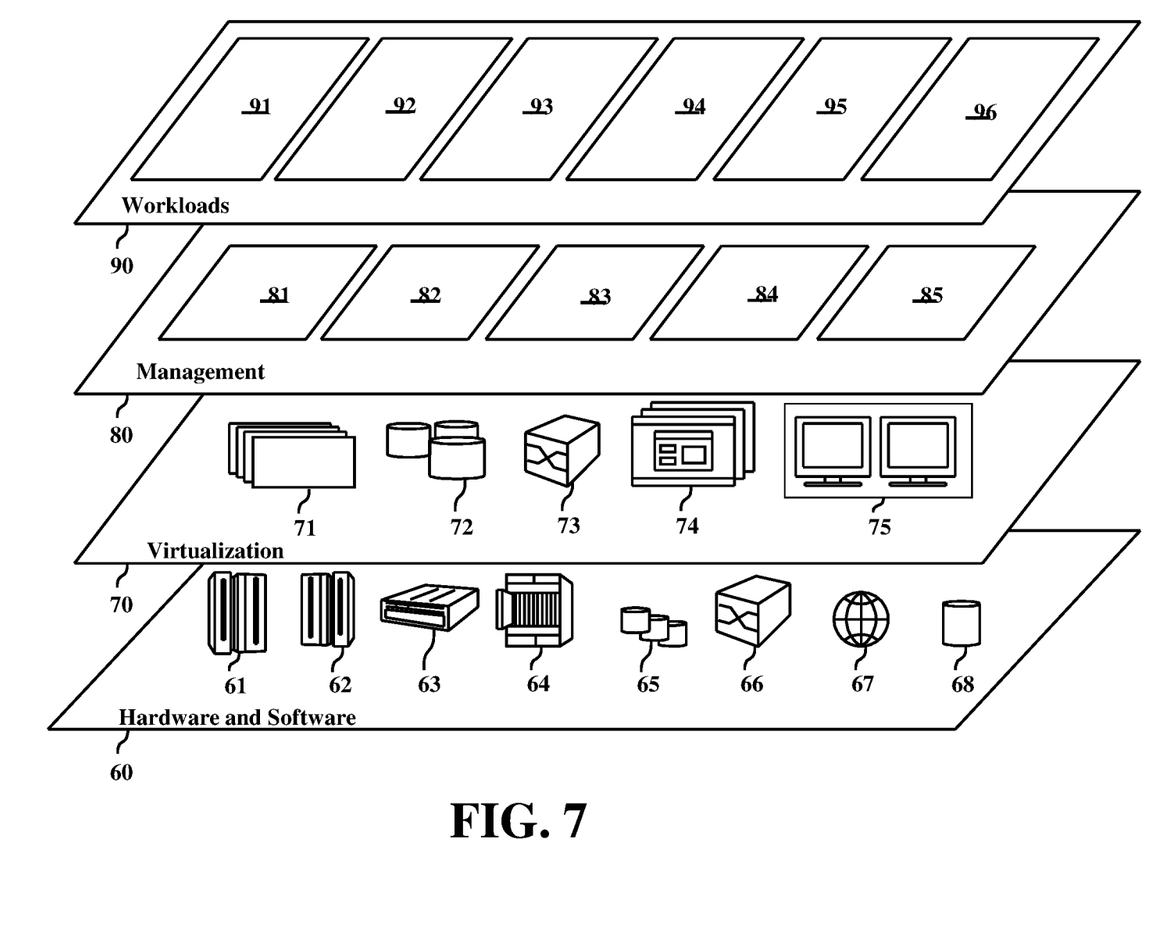
FIG. 7 is a functional block diagram depicting abstraction model layers, in accordance with an embodiment of the present invention.

FIG. 7 is a block diagram depicting a set of functional abstraction model layers provided by cloud computing environment 50 depicted in FIG. 6 in accordance with at least one embodiment of the present invention. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and natural language translation and lip synchronization optimization 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for optimizing generated lip-synced videos for neural machine translations, the computer-implemented method comprising:
   receiving, by a processor, a source video of a speaker in a source language;
   synthesizing a plurality of speech translations of the source video in a target language, where the target language is different than the source language, based on a neural machine translation model, wherein the neural machine translation model is trained to synthesize a variable number of translations based on a variable beam width, wherein synthesizing comprises: extracting audio data from the source video, generating a transcript in the source language for the extracted audio data; generating at least one translation script in the target language based on the transcript in the source language, wherein the number of translation scripts is based on the variable beam width; and converting each translation script into speech based on a text to speech system, wherein the translation script is the topK result of the translation into the target language;
   generating a lip synchronized video for each of the plurality of synthesized speech translations based on a generation sub-model within a generative adversarial network architecture;
   classifying each lip synchronized video as synchronized or not synchronized, based on a classification sub-model within a generative adversarial network; and
   generating a lip-sync score for each lip synchronized video classified as synchronized.

2. The computer-implemented method of claim 1, further comprising:
   training the generative adversarial network architecture to generate lip synchronized video.

3. The computer-implemented method of claim 2, wherein training the generative adversarial network to generate lip synchronized video further comprises:
   applying a corpus of audio and video data of speakers, wherein the corpus is comprised of a plurality of original examples, speaking in a source language to a generative sub-model initialized to generate lip synchronized video in the target language;
   generating lip synchronized video data for each of the provided audio data in the target language;
   classifying each generated video data as synchronized or not synchronized;
   calculating a generative adversarial network loss for each generated video against the original examples; and
   updating the generative sub-model with the calculated generative adversarial network loss.

4. The computer-implemented method of claim 1, wherein the neural machine translation model is based on an auto-encoder model comprised of at least two recurrent neural networks and a fully connected neural network to generate a probability of the most likely translation.

5. The computer-implemented method of claim 1, wherein scoring each lip synchronized video classified as synchronized further comprises:
   applying each lip synchronized video classified as synchronized to a fully connected neural network with a softmax output, wherein the softmax output is a probability the translated script and lip synchronized video are the most probable result.

6. A computer system for optimizing generated lip-synced videos for neural machine translations, the system comprising:
one or more computer processors;
one or more computer readable storage media;
computer program instructions to;
receive a source video of a speaker in a source language;
synthesize a plurality of speech translations of the source video in a target language, where the target language is different than the source language, based on a neural machine translation model, wherein the neural machine translation model is trained to synthesize a variable number of translations based on a variable beam width, wherein synthesizing comprises: extract audio data from the source video, generate a transcript in the source language for the extracted audio data; generate at least one translation script in the target language based on the transcript in the source language, wherein the number of translation scripts is based on the variable beam width; and convert each translation script into speech based on a text to speech system, wherein the translation script is the topK result of the translation into the target language;
generate a lip synchronized video for each of the plurality of synthesized speech translations based on a generation sub-model within a generative adversarial network architecture;
classify each lip synchronized video as synchronized or not synchronized, based on a classification sub-model within a generative adversarial network; and
generate a lip-sync score for each lip synchronized video classified as synchronized.

7. The computer system of claim 6, further comprising instructions to:
train the generative adversarial network architecture to generate lip synchronized video.

8. The computer system of claim 7, wherein training the generative adversarial network to generate lip synchronized video further comprises:
apply a corpus of audio and video data of speakers, wherein the corpus is comprised of a plurality of original examples, speaking in a source language to a generative sub-model initialized to generate lip synchronized video in the target language;
generate lip synchronized video data for each of the provided audio data in the target language;
classify each generated video data as synchronized or not synchronized;
calculate a generative adversarial network loss for each generated video against the original examples; and
update the generative sub-model with the calculated generative adversarial network loss.

9. The computer system of claim 6, wherein the neural machine translation model is based on an auto-encoder model comprised of at least two recurrent neural networks and a fully connected neural network to generate a probability of the most likely translation.

10. The computer system of claim 9, wherein scoring each lip synchronized video classified as synchronized further comprises:

applying each lip synchronized video classified as synchronized to a fully connected neural network with a softmax output, wherein the softmax output is a probability the translated script and lip synchronized video are the most probable result.

11. A computer program product for optimizing generated lip-synced videos for neural machine translations, the computer program product comprising one or more computer readable storage media and program instructions sorted on the one or more computer readable storage media, the program instructions comprising instructions to:
receive a source video of a speaker in a source language;
synthesize a plurality of speech translations of the source video in a target language, where the target language is different than the source language, based on a neural machine translation model, wherein the neural machine translation model is trained to synthesize a variable number of translations based on a variable beam width, wherein synthesizing comprises: extract audio data from the source video, generate a transcript in the source language for the extracted audio data; generate at least one translation script in the target language based on the transcript in the source language, wherein the number of translation scripts is based on the variable beam width; and convert each translation script into speech based on a text to speech system, wherein the translation script is the topK result of the translation into the target language;
generate a lip synchronized video for each of the plurality of synthesized speech translations based on a generation sub-model within a generative adversarial network architecture;
classify each lip synchronized video as synchronized or not synchronized, based on a classification sub-model within a generative adversarial network; and
generate a lip-sync score for each lip synchronized video classified as synchronized.

12. The computer program product of claim 11, further comprising instructions to:
train the generative adversarial network architecture to generate lip synchronized video.

13. The computer program product of claim 12, wherein training the generative adversarial network to generate lip synchronized video further comprises:
applying a corpus of audio and video data of speakers, wherein the corpus is comprised of a plurality of original examples, speaking in a source language to a generative sub-model initialized to generate lip synchronized video in the target language;
generating lip synchronized video data for each of the provided audio data in the target language;
classifying each generated video data as synchronized or not synchronized;
calculating a generative adversarial network loss for each generated video against the original examples; and
updating the generative sub-model with the calculated generative adversarial network loss.

14. The computer program product of claim 11, wherein the neural machine translation model is based on an auto-encoder model comprised of at least two recurrent neural networks and a fully connected neural network to generate a probability of the most likely translation.

* * * * *